United States Patent
Döbele

(10) Patent No.: US 6,729,999 B2
(45) Date of Patent: May 4, 2004

(54) DRIVE ARRANGEMENT

(75) Inventor: Bernd Döbele, Salem (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 10/216,409

(22) Filed: Aug. 8, 2002

(65) Prior Publication Data

US 2004/0029680 A1 Feb. 12, 2004

(30) Foreign Application Priority Data

Aug. 10, 2001 (DE) .......................... 101 39 558

(51) Int. Cl.$^7$ ................................. B60K 41/08
(52) U.S. Cl. .................... 477/90; 477/91; 477/109
(58) Field of Search .................. 477/70, 90, 91, 477/107, 109, 901

(56) References Cited

U.S. PATENT DOCUMENTS

| | | | |
|---|---|---|---|
| 4,544,057 A | * 10/1985 | Webster et al. | 477/86 |
| 4,807,132 A | 2/1989 | Arai et al. | 364/424.1 |
| 5,583,766 A | * 12/1996 | Birchenough et al. | 477/109 |
| 6,007,455 A | * 12/1999 | Steeby | 477/109 |
| 6,246,941 B1 | * 6/2001 | Sayman | 477/109 |
| 2002/0032097 A1 | * 3/2002 | Koelle et al. | 477/90 |
| 2002/0055412 A1 | * 5/2002 | Suzuki | 477/107 |
| 2002/0055413 A1 | * 5/2002 | Genise et al. | 477/109 |

FOREIGN PATENT DOCUMENTS

| | | | |
|---|---|---|---|
| DE | 36 23 88 A1 | 1/1987 | F02D/41/04 |
| DE | 40 26 659 A1 | 2/1991 | B60K/41/08 |
| DE | 40 12 595 A1 | 10/1991 | B60K/41/02 |
| DE | 43 38 116 | 5/1995 | B60K/23/02 |
| DE | 195 38 308 | 5/1996 | B60K/41/06 |
| GB | 2 243 655 A | 11/1991 | F16H/61/00 |

* cited by examiner

Primary Examiner—Charles A. Marmor
Assistant Examiner—Dennis Abdelnour
(74) Attorney, Agent, or Firm—Davis & Bujold, PLLC

(57) ABSTRACT

With a drive arrangement of a motor vehicle with a drive motor (2) actuated by means of E-gas and a manual gear shift (10), which is operationally connectable electively with the output shaft (4) of the drive motor (2) by a disconnection-type clutch, which can be manually activated by the driver, the rotational speed of the output shaft (4) of the drive motor (2) is adjusted to a desired rotational speed which depends upon the rotational number of the input shaft (8) of the gear shift (10) as long as the clutch is open.

4 Claims, 3 Drawing Sheets

DRIVE ARRANGEMENT

FIELD OF THE INVENTION

The invention concerns a drive arrangement of a motor vehicle.

BACKGROUND OF THE INVENTION

Drive arrangements of this type are also in use in large numbers in commercial vehicles. To shift gears, the driver usually opens the disconnection-type clutch or starting clutch manually by activating the clutch pedal. After the new gear is set by activation of the shift lever, the clutch is closed again. Slippage on the clutch usually arises for a short time while closing the clutch.

Whether a gear shift is felt to be comfortable and how great the clutch wear and tear is depends basically upon what motor load or motor rotational speed is applied by the driver on the accelerator pedal during the closing of the clutch. Inexperienced drivers frequently cause unintended shifting shocks and/or a high clutch wear and tear when re-engaging the clutch.

The invention is, therefore, based upon the objective of supporting the driver of a motor vehicle with a manual gear shift so that comfortable gear shifts with little clutch wear and tear are reliably achieved.

SUMMARY OF THE INVENTION

In contrast with a drive arrangement with a conventional, manual gear shift, the drive arrangement of the invention has a clutch status recognition apparatus, an apparatus for determining the rotational speed of the shifting gearbox, and a control device that receives signals from the clutch status recognition apparatus and from the rotational speed determination apparatus. The control facility evaluates a signal from a load cell (accelerator pedal). During normal driving operation, apart from shifts, this signal is decisive for controlling motor load.

This arrangement, also designated as "E-gas," is used in many modern drive arrangements.

The clutch status recognition apparatus can, for example, consist of a circuit which is arranged on the clutch pedal or on the clutch itself and shifts depending upon the activation path of the clutch. A rotational speed sensor on the gearbox input shaft serves as a rotational speed determination apparatus. The control unit is an electronic motor and/or gearbox control unit.

As soon as the disconnection-type clutch or starting clutch is opened for the purpose of shifting gears, the drive motor no longer reacts to the load specification of the driver on the accelerator pedal. Rather, in this state, the control unit adjusts the rotational speed of the output shaft of the drive motor to a desired rotational speed, which is dependent upon the rotational speed of the input shaft of the shifting gear. As soon as the disconnection-type clutch is closed again, the drive motor is again controlled by the driver by way of the accelerator pedal.

For the least clutch wear and tear, the desired rotational speed for the rotational speed of the output shaft of the drive motor is set equal to the rotational speed of the input shaft so that, upon engagement, practically no slippage prevails on the clutch.

In an advantageous embodiment of the invention is provided a recognition apparatus for a load direction before the gear change, which differentiates between the load directions "pull" and "push." The latter can, for example, consist of an electronic motor and/or gearbox control unit in which a pull-push characteristic curve is deposited in a memory region in the form of motor load values over motor rotational speed values.

If closing takes place toward the "pull" load direction, the desired rotational speed for the rotational speed of the output shaft of the drive motor is one offset amount higher than the rotational speed of the input shaft of the shift gearbox. If closing takes place in the "push" direction, the desired rotational speed for the rotational speed of the output shaft of the drive motor is one offset amount less than the rotational speed of the input shaft of the shift gearbox. In this way, transmitting a torque is achieved already during the slippage phase while re-engaging the drive motor, while the load direction corresponds to the load direction before the gear shift. The phase of tractive force interruption is hereby shortened, and it is moreover ensured that no change in load direction occurs during the gear change, which would be felt to be uncomfortable. The value of the offset amount is selected so that no harmful clutch wear and tear occurs.

In an advantageous embodiment of the invention is ascertained the offset amount dependent from a tractive force level of the vehicle ahead of the gear change, wherein to a higher tractive force level is allocated a larger offset amount. With shifts in the region of the pull-push characteristic curve are thus selected only very low values for the offset amounts, so that no unintended change in acceleration results when re-engaging.

The length of time from the time point at which the new gear is set in the gearbox with an opened disconnection-type clutch up to the time point in which the disconnection-type clutch is closed is often very short. On the other hand, especially with larger drive motors, a specific period of time is needed until a desired rotational speed specification is attained. In an embodiment of the invention, a target gear predicting apparatus is hence present which predicts a target gear step on the basis of an operating status prevailing prior to the gear shift. A gearbox input rotational speed computation apparatus calculates the then presumably applying rotational speed of the input shaft of the shift gearbox on the basis of the predicted target gear step. For this calculation, a value of the traveling speed or the rotational speed of the output shaft of the gearbox as well as the gear ratio values of the individual gear steps deposited in a memory region of the electronic gearbox control unit are moreover adduced.

As long as the new gear step is not yet set, the desired rotational speed for the output shaft of the drive motor is determined in dependence upon this calculated rotational speed of the input shaft. In this way, the rotational speed of the drive motor is already influenced at an earlier point in time-namely, as a rule as soon as the clutch is opened-so that after the gear step is actually set, the rotational speed of the drive motor already largely corresponds to the then established desired rotational speed specification. The target gear predicting-apparatus is comprised by a calculation process deposited in the electronic motor and/or gearbox control unit. In the simplest case, an adjacent gear step is adopted as the target gear, while at high rotational speeds of the drive motor, the next higher gear step is adopted, and at lower rotational speeds of the drive motor, the next smaller gear step is adopted.

BRIEF DESCRIPTION OF THE DRAWINGS

The invention will now be described, by way of example, with reference to the accompanying drawings in which.

DETAILED DESCRIPTION OF THE INVENTION

Figure 1:
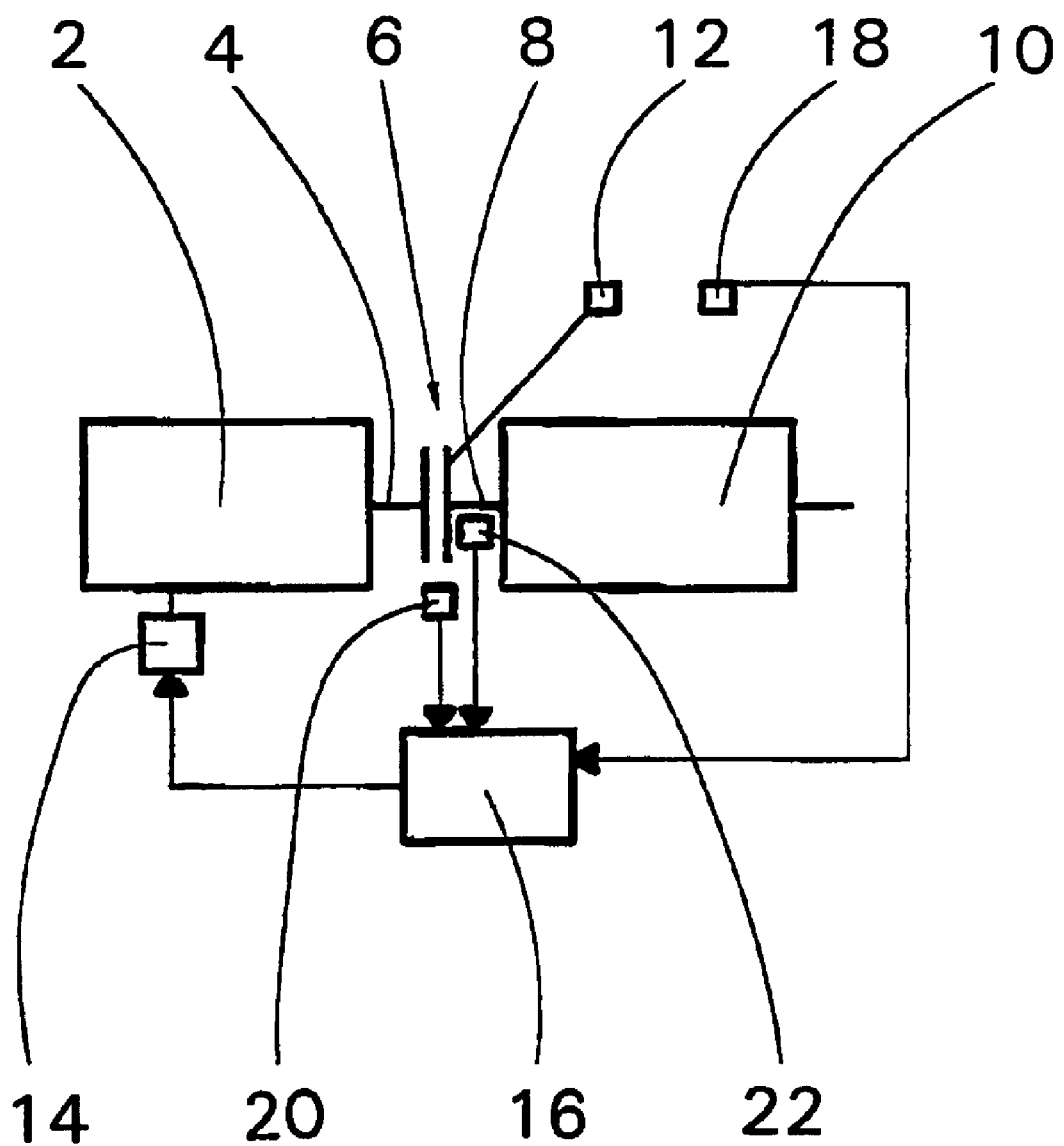
FIG. 1 shows schematically a drive arrangement of the invention.

A drive motor, whose output shaft 4 can be electively connected by a disconnection-type clutch 6 with the input shaft 8 of a manual gear shift 10, is designated with 2 in FIG. 1. The clutch pedal which stands in operative connection with the disconnection-type clutch 6 is designated with 12. The injection pump 14 serves to allocate an amount of fuel for the drive motor 2. It is actuated by an electronic control unit 16. In normal driving operation, the electronic control unit 16 converts the load commands specified by the driver on the accelerator 18 directly for actuation of the injection pump 14. The electronic gearbox control unit 16 is moreover fed a signal form a rotational speed sensor 22, which is arranged on the gearbox input shaft, and a signal from a clutch sensor 20. As long as the clutch sensor indicates that the clutch is opened, the control unit 16 adjusts the rotational speed of the output shaft 4 of the drive motor 2 to a desired rotational speed, which is dependent upon the rotational speed of the input shaft of the shifting gearbox.

Figure 2:
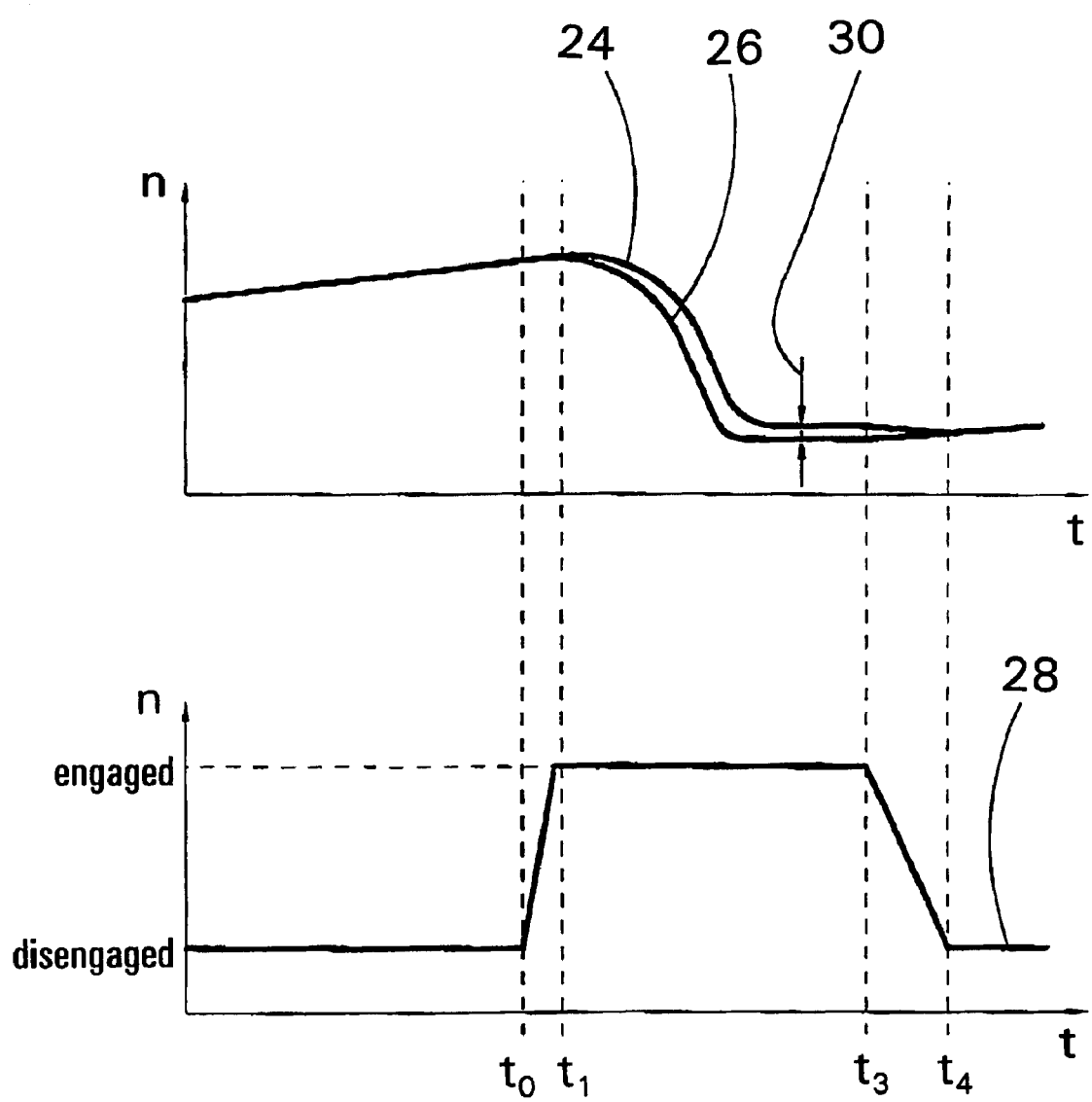
FIG. 2 represents a time progression of a pull upshift.

In FIG. 2, the time progression of the rotational speed of the output shaft 4 of the drive motor is designated with 24 and the time progression of the rotational speed of the input shaft 8 of the shifting gearbox with 26. The signal of the clutch sensor 20 is designated with 28. At time point t0, the driver steps upon the clutch pedal, which is passed through at time t1, so that the clutch status "open" is reached. At time point t1, the motor control unit 16 switches from a type of operation in which the signals for the injection pump 14 are determined by the accelerator pedal 18, to a type of operation in which the rotational speed of the output shaft 4 of the drive motor is adjusted to a desired rotational speed, which depends upon the rotational speed of input shaft 8 of the shift gearbox 10. The desired rotational speed for the rotational speed of the output shaft 4 of the drive motor 2 is an offset amount 30 larger than the rotational speed of the input shaft 8 of the shifting gearbox 10, as it is a matter of a pull gear change. Up to time t3, the rotational speed of drive motor 24 is adjusted to rotational speed 26 of the gearbox input shaft. From time point t3 up to time point t4, the driver re-closes the clutch pedal, wherein the slippage generated by the offset amount 30 is gradually reduced. By way of the rotational speed of the drive motor, which is larger by an offset amount 30, it is guaranteed that during closing of the clutch between times t3 and t4, the load direction of "pull" applies.

Figure 3:
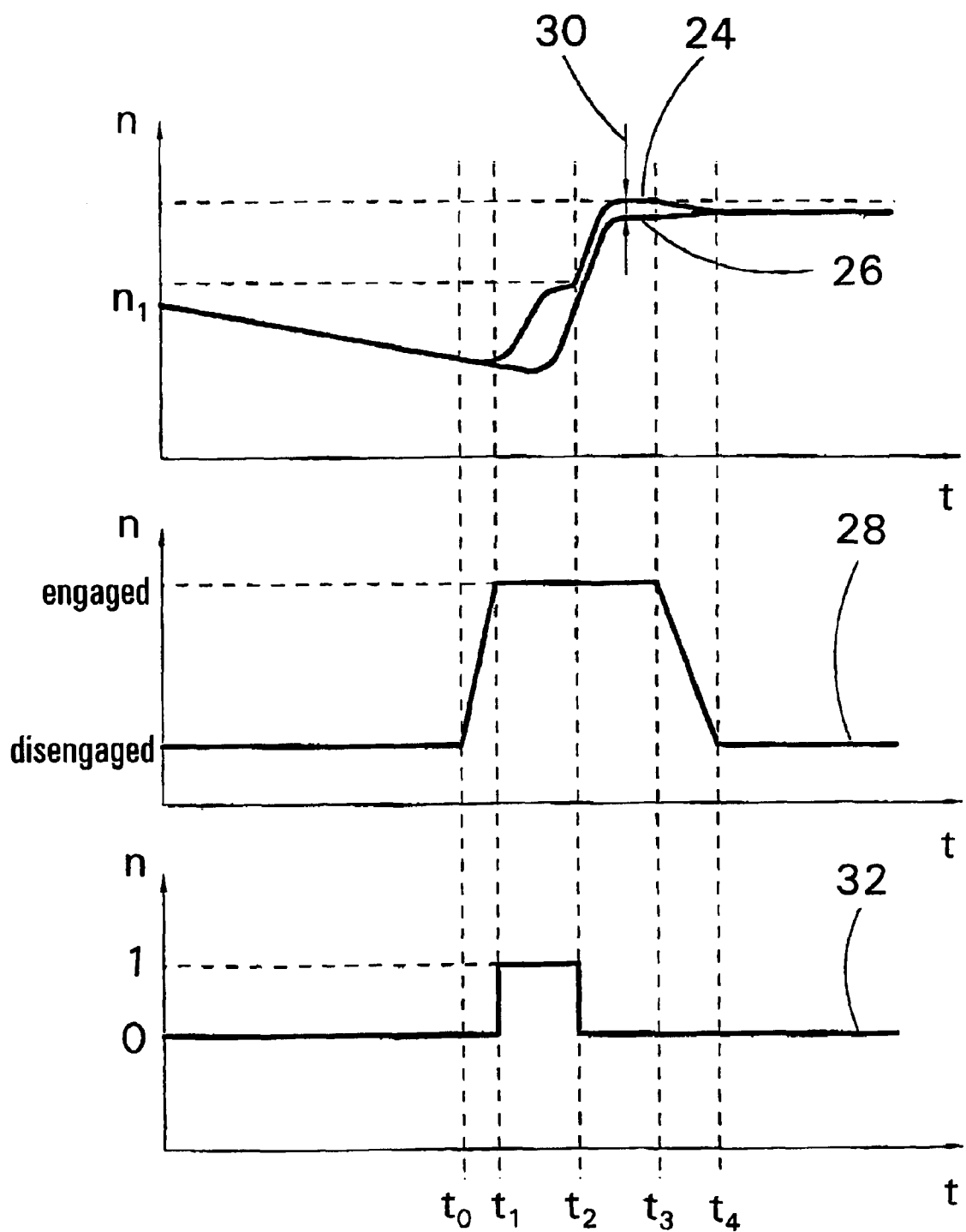
FIG. 3 depicts a time progression of a pull back shift.

FIG. 3 shows the time progression of a pull resetting. The motor rotational speed is once again designated with 24 and the gearbox input rotational speed with 26. At time t1, the disconnection-type clutch is opened again so that the clutch status of "open" applies. At the same time, the old gear step is also disengaged so that the shifting status of "neutral" applies, which is shown by line 32. At this time, the gearbox input shaft 8 is neither coupled with the drive motor nor with the output shaft of the gearbox, so that its rotational speed does not increase at first. On the basis of the driving status before the gear change, however, it is concluded that a resetting will follow. Therefore already beginning with time t1 at which "neutral" applies, a desired value for the rotational speed of the output shaft of the output motor can be ascertained taking the smallest gear break into consideration. The value of this desired rotational speed is designated with n1. At time point t2, the "neutral" shifting status is abandoned, and the target gear step is in fact defined. At this time point, a desired rotational speed is adduced for the rotational speed of the drive motor, which is greater by an offset amount 30 than the rotational speed of the gearbox input shaft. In the time period between t3 and t4, the clutch is closed once again and the rotational speed and slippage are reduced.

Reference Numerals
2 drive motor
4 output shaft
6 disconnection-type clutch
8 input shaft
10 shifting gearbox
12 clutch pedal
14 injection pump
16 control unit
18 accelerator pedal
20 clutch sensor
22 sensor
24 motor rotational speed
26 rotational speed
28 clutch status
30 offset
32 shifting status

What is claimed is:

1. A drive arrangement of a motor vehicle, comprising:
   a drive motor (2) having an output shaft (4) which is actuated by means of E-gas wherein a control apparatus evaluates a control signal from a load cell during non-shifting normal driving operations, wherein the control signal is decisive for controlling a motor load;
   a shifting gearbox (10) having an input shaft (8) which has a plurality of gear steps that can be set manually by the driver;
   a disconnection-type clutch (6) which can be activated manually by the driver and that operationally connects the input shaft (8) of the shift gearbox to the output shaft (4);
   a clutch status recognition apparatus (20)
   a rotational speed determining apparatus (22) for determining a rotational speed of the input shaft (8) of the shift gearbox (10) while the disconnection-type clutch (6) is opened for the purpose of a gear step change; and
   the control apparatus (16) which receives signals from the clutch status recognition apparatus (20) and the rotational speed determining apparatus (22) and which adjusts the rotational speed of the output shaft (4) of the drive motor to a desired rotational speed while the disconnection-type clutch (6) is open, which is dependent upon the rotational speed of the input shaft (8) of the shifting gearbox (10); wherein
   the recognition apparatus (20) distinguishes between the load directions of pull and push and the control apparatus adjusts the rotational speed of the output shaft of the drive motor so that
   the desired rotational speed of the output shaft of the drive motor is
   higher than the rotational speed (26) of the input shaft of the shift gear box by an offset amount (30) in the load direction of pull, and
   smaller than the rotational speed (26) of the input shaft of the shift gear box by an offset amount (30) in the load direction push, and so that
   when the disconnection-type clutch (6) is closed after the gear step change the same load direction applies as before the gear step change.

2. The drive arrangement according to claim 1, wherein the offset amount (30) is determined in dependence upon a tractive force level of the vehicle ahead of the gear step change, wherein a greater offset is allocated to a higher tractive force level.

3. The drive arrangement according to claim 1, wherein a target gear-predicting apparatus is provided which predicts a target gear step following the gear step change on the basis of a driving status prevailing prior to the gear step change, and in that a gearbox input rotational speed determining apparatus is present, which calculates the rotational speed of the input shaft of the shift gearbox which is then applied, and wherein, as long as the new gear step is not yet set, the desired rotational speed of the output shaft of the drive motor is ascertained as a function of this calculated rotational speed of the input shaft.

4. The drive arrangement according to claim 3, wherein the target gear step is directly adjacent to the gear step set prior to the gear step change, whereby at high rotational speeds of the drive motor, the next highest rotational speed of the drive motor is assumed, and at lower rotational speeds of the drive motor, the next lower gear step is assumed.

* * * * *